United States Patent
Taipalus et al.

(10) Patent No.: US 11,946,507 B2
(45) Date of Patent: Apr. 2, 2024

(54) METAL-PLASTIC PLAIN-BEARING COMPOSITE MATERIAL AND PLAIN BEARING ELEMENT PRODUCED THEREFROM

(71) Applicant: KS Gleitlager GmbH, St. Leon-Rot (DE)

(72) Inventors: Riitta Taipalus, Limburgerhof (DE); Rolf Reinicke, Bad Schoenborn (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 863 days.

(21) Appl. No.: 16/636,115

(22) PCT Filed: Jul. 27, 2018

(86) PCT No.: PCT/EP2018/070407
§ 371 (c)(1),
(2) Date: May 24, 2021

(87) PCT Pub. No.: WO2019/025307
PCT Pub. Date: Feb. 7, 2019

(65) Prior Publication Data
US 2021/0317874 A1    Oct. 14, 2021

(30) Foreign Application Priority Data

Aug. 4, 2017 (DE) .................. 10 2017 117 736.1

(51) Int. Cl.
| | |
|---|---|
| *C08K 3/30* | (2006.01) |
| *B32B 7/12* | (2006.01) |
| *C08K 7/02* | (2006.01) |
| *C08L 27/18* | (2006.01) |
| *F16C 33/20* | (2006.01) |
| *B32B 15/082* | (2006.01) |
| *B32B 15/18* | (2006.01) |
| *C08L 77/06* | (2006.01) |
| *C08L 79/08* | (2006.01) |

(52) U.S. Cl.
CPC .............. *F16C 33/205* (2013.01); *C08K 3/30* (2013.01); *C08L 27/18* (2013.01); *B32B 7/12* (2013.01); *B32B 15/082* (2013.01); *B32B 15/18* (2013.01); *B32B 2250/02* (2013.01); *B32B 2264/0242* (2013.01); *B32B 2264/0271* (2013.01); *B32B 2264/104* (2013.01); *B32B 2264/12* (2013.01); *B32B 2264/303* (2020.08); *B32B 2270/00* (2013.01); *B32B 2307/554* (2013.01); *B32B 2475/00* (2013.01); *C08K 2003/3045* (2013.01); *C08K 7/02* (2013.01); *C08L 77/06* (2013.01); *C08L 79/08* (2013.01); *C08L 2205/02* (2013.01); *C08L 2205/03* (2013.01); *C08L 2205/16* (2013.01); *F16C 2208/02* (2013.01); *F16C 2208/32* (2013.01)

(58) Field of Classification Search
None
See application file for complete search history.

(56) References Cited

U.S. PATENT DOCUMENTS

| | | | |
|---|---|---|---|
| 6,376,061 B1 | 4/2002 | Adam | |
| 8,802,602 B2 | 8/2014 | Schmitjes et al. | |
| 2007/0021544 A1 | 1/2007 | Yanase et al. | |
| 2011/0148064 A1 | 6/2011 | Yanase et al. | |
| 2014/0010484 A1* | 1/2014 | Schmitjes | B32B 15/08 384/42 |
| 2014/0100144 A1 | 4/2014 | Zielger et al. | |
| 2016/0319867 A1* | 11/2016 | Adam | C08K 3/30 |

FOREIGN PATENT DOCUMENTS

| | | |
|---|---|---|
| DE | 19808540 B4 | 5/2004 |
| DE | 102011077008 A1 | 12/2012 |
| DE | 102013227187 A1 | 7/2015 |
| EP | 0938970 B1 | 5/2004 |
| EP | 1647574 A1 | 4/2006 |
| EP | 2316707 A1 | 5/2011 |
| EP | 2532905 A1 | 12/2012 |
| WO | 2008128579 A1 | 10/2008 |
| WO | 2014049137 A1 | 4/2014 |
| WO | 2015097158 A1 | 7/2015 |

OTHER PUBLICATIONS

German Examination Report dated Mar. 9, 2018.

\* cited by examiner

*Primary Examiner* — Sheeba Ahmed
(74) *Attorney, Agent, or Firm* — Dilworth & Barrese, LLP

(57) ABSTRACT

The invention relates to a metal-plastic plain-bearing composite material (2), in particular for producing plain bearing elements for lubricated applications, comprising a metal support layer (4), in particular of steel or bronze, and comprising a sliding layer (12) of a sliding material (8) of a matrix-forming PTFE polymer base with fillers that improve the tribological properties, said sliding layer being in sliding contact with a sliding partner, characterized in that the sliding material contains as fillers
1-15 vol % barium sulfate,
5-20 vol % aramid,
1-10 vol % polyimide and
1-15 vol % fluorothermoplastic, excluding PTFE,
as well as a plain-bearing composite material and a plain bearing element.

20 Claims, 2 Drawing Sheets

METAL-PLASTIC PLAIN-BEARING COMPOSITE MATERIAL AND PLAIN BEARING ELEMENT PRODUCED THEREFROM

This application claims priority to German Patent Application No. 102017117736.1 filed on Aug. 4, 2017, the contents of which are incorporated by reference herein in their entirety.

The invention relates to a metal-plastic plain-bearing composite material, in particular for producing plain bearing elements for lubricated applications, comprising a metal support layer, in particular of steel or bronze, and comprising a sliding layer of a sliding material of a matrix-forming PTFE polymer base with fillers that improve the tribological properties, said sliding layer being in sliding contact with a sliding partner.

In the prior art, a large number of sliding materials are known, which are, for example, PTFE-based and use a variety of fillers.

For example, DE 10 2011 077 008 A1 describes a PTFE-based plain-bearing composite material, fillers comprising thermoplastics and/or thermosets and further tribologically active substances being present together in compounded form in the polymer base of the sliding layer material.

Furthermore, EP 2 316 707 A1 and EP 1 647 574 A1 disclose a plain-bearing composite material based on PTFE with barium sulfate, phosphate and metal sulfide in an amount of 0.1 to 2%.

EP 0 938 970 B1 describes a layered composite material with a matrix of PTFE or PTFE in combination with ETFE in which fillers are embedded. In particular, a powdered aramid can be used as the filler. The aramid should have a proportion of 0.5 to 10% vol %, the proportion of the further fillers being 9.5 to 44.5% vol % and the proportion of the polymer base 55 to 90% vol %. In addition, polyimides can be used as additional fillers.

Finally, DE 198 08 540 B4 describes a layered composite material based on PTFE with 10-50 vol % of a powdered aramid. In addition, other fillers such as polyimide can be used. According to one variant, the material contains further fluorothermoplastics.

Despite the large number of known sliding materials, there is still a need for sliding materials, in particular as a bearing material for applications operated under grease lubrication at high loads.

Since then, in particular in the case of slow reversing rotational movements, there has been the problem that the metal-plastic plain-bearing composite materials known in the art either have excessive wear or an excessive coefficient of friction. Providing a metal-plastic plain-bearing composite material that solves this problem is the object of the invention.

The object is achieved by a metal-plastic plain-bearing composite material comprising a sliding layer of a sliding material of a matrix-forming PTFE polymer base with fillers that improve the tribological properties, characterized in that the sliding material contains 1-15 vol % barium sulfate,
5-20 vol % aramid,
1-10 vol % polyimide and
1-15 vol % fluorothermoplastic, excluding PTFE,
as fillers. The parts by volume of the fillers are in relation to the sliding material.

Such metal-plastic plain-bearing composite materials show an improved behavior in highly loaded, lubricated applications with low sliding speeds. Such applications are usually slow, reversing rotational movements, such as those found in seat adjusters. In addition, other hinges can be used as areas of application. The application is preferably in applications remote from the engine in the automotive sector.

Barium sulfate is used to increase the strength of the sliding material, with polyimide and aramid increasing the wear resistance. The addition of one or more fluorothermoplastics, excluding PTFE, improves the adhesive effect and integration of all other fillers in the PTFE polymer base and thus serves as an adhesion promoter.

A sliding material having the following fillers is particularly preferred:

1 to 10 vol % barium sulfate
10 to 15 vol % aramid
1 to 10 vol %, in particular 1-8 vol % polyimide and
1 to 10 vol %, in particular 1-8 vol % fluorothermoplastic excluding PTFE.

Also particularly preferred is a sliding material that contains as fillers 3 to 7 vol % barium sulfate,
10 to 13% vol % aramid,
3 to 8 vol % polyimide and
3 to 7 vol % fluorothermoplastic excluding PTFE.

It is particularly preferred if the fluorothermoplastics are selected from the group FEP, PFA or MFA or combinations thereof. A particularly preferred modification of the PTFE polymer base is achieved with these fluorothermoplastics.

It is particularly advantageous here if the aramid and/or the polyimide are introduced as a powdery additive. The particulate aramid and/or polyimide are embedded in the matrix. It is further preferred if the particle size of the aramid has a D50 value of 30 μm to 90 μm for aramid. The diameter of the aramid particles should not exceed 200 μm. The D50 value of the aramid particles is determined according to the measurement method ISO 13320, static laser scattered light analysis. The D50 value of the particle size of the polyimide should preferably be 1 μm to 20 μm and is determined using the same method.

For the fluorothermoplastics, preferably FEP, the D50 value for the particle size should be between 20 μm and 80 μm, also determined according to ISO 13320.

For the other filler barium sulfate, the preferred D50 value of the particle size is 0.2 μm to 1.4 μm. The determination is made according to DIN 66111 and here via particle size analysis by means of sedimentation. A very low value for barium sulfate is particularly preferred since this has a positive effect on the strength of the sliding material.

D50 refers to percentages by mass.

In contrast to a fiber, for example, a powder is understood to mean a particle having a shape in which, based on extensions in three axes, the longest extension is no more than five times as long as the shortest extension, preferably no more than three times and more preferably no more than twice as long.

In addition to a powder form, aramid and/or polyimide can also be present in fibrous form and used according to the invention. The fiber shape has a ratio of length to diameter greater than 5:1.

Ratios of the parts by volume of aramid to polyimide from 15:1 to 2:1 and preferably from 10:1 to 3:1 are preferred.

Preferred ratios of the parts by volume of barium sulfate to one or more fluorothermoplastics are 3:1 to 1:3 and preferably 2:1 to 1:2.

The addition of fluorothermoplastics to the PTFE polymer base modifies the PTFE in such a way that the adhesion of all components of the sliding material to one another is improved, which improves the wear resistance.

It is particularly preferably provided that it is a lead-free sliding material. This allows important environmental aspects to be taken into account.

According to the invention, the sliding material is part of a metal-plastic plain-bearing composite material, in particular for producing plain bearing elements for lubricated applications with a metal support layer, in particular of steel or bronze, and a sliding layer which is in sliding contact with a sliding partner. Such applications are grease-lubricated applications which are designed to rotate slowly or in reverse and in which a high load is applied with a slow sliding movement. Such plain-bearing composite materials are used in the automotive field, remote from the engine, for example in hinges or seat adjusters.

It is particularly preferred if the sliding material is anchored in a porous carrier layer formed on the metal support layer, in particular in a carrier layer sintered on from metallic particles.

Alternatively, the sliding material can be anchored directly to a microstructured surface of the metal support layer.

Furthermore, it can alternatively be provided that the sliding material is applied, preferably glued, to the metal support layer by means of an adhesive bonding layer.

Another possible variant is also to apply the sliding material according to the invention to a metal mesh or lattice, for example in the form of an expanded metal. These can consist, for example, of a bronze material. The metal mesh or lattice, in particular the expanded metal, can be used as a support or carrier layer.

The sliding material can be produced in various ways. For example, a PTFE dispersion to which the fillers are added can be precipitated, as a result of which the PTFE polymer base with the fillers separates from the water. This creates a kind of paste. This paste can be applied to the porous carrier and rolled into it and is then sintered out. The material is then cut into strips and the resulting panels are wound into shells or sleeves.

Alternatively, it is also possible to mix PTFE powder and fillers, especially for thicker layers. The material is then added into a substantially cylindrical mold and pressure sintered. This creates a shaped body from which a kind of film can be obtained by peeling. This film can then be applied to the support layer, in particular glued on.

The use of a plain-bearing composite material comprising a sliding layer according to the type described above achieves the advantage that the properties of friction and wear can be influenced in a positive manner, i.e. in the direction of low wear and low friction, for the applications described above.

The plain-bearing composite material is furthermore designed in particular such that the layer thickness of the metal support layer is 0.15 to 5 mm and the layer thickness of the porous carrier layer, if provided, is at least 0.05 mm, in particular at least 0.1 mm, in particular at least 0.2 mm and at most 0.6 mm, in particular at most 0.5 mm and that the protrusion of the sliding material over the porous carrier layer is at least 10 μm, in particular at least 20 μm and in particular at least 30 μm, in particular at least 50 μm, in particular at least 100 μm and in particular at most 600 μm, in particular at most 500 μm, in particular at most 400 μm. In the case of paste-based sliding materials rolled into the material, the protrusion is preferably 5-80 μm, preferably 10 to 50 μm, and in the case of film-like sliding materials 100-400 μm and preferably 150 to 300 μm.

In addition, protection is claimed for a method for producing a sliding material for a metal-plastic plain-bearing composite material, in particular for producing plain bearing elements for lubricated applications comprising a metal support layer, in particular of steel or bronze, and a sliding layer in sliding contact with a sliding partner, said sliding layer being made of a sliding material based on a PTFE polymer base, with fillers that improve the tribological properties being added to the PTFE polymer base in the following proportions and particle sizes:

1-15 vol % barium sulfate,
5-20 vol % aramid,
1-10 vol % polyimide and
1-15 vol % fluorothermoplastic excluding PTFE,
and the particles of the added substantially spherical filler particles having a D50 value for
barium sulfate of 0.2-1.4 μm
aramid of 30-90 μm
polyimide of 1-20 μm and
fluorothermoplastic, excluding PTFE, of 20-80 μm.

For aramid, the value Dmax is preferably 200 μm.

Poly-paraphenylene terephthalamide is preferably used as the aramid and FEP as the fluorothermoplastic, and in this case a copolymer of hexafluoropropylene and tetrafluoroethylene.

Further details, features and advantages of the invention result from the attached patent claims and from the graphic illustration and subsequent description of a preferred embodiment of the invention.

Figure 1:
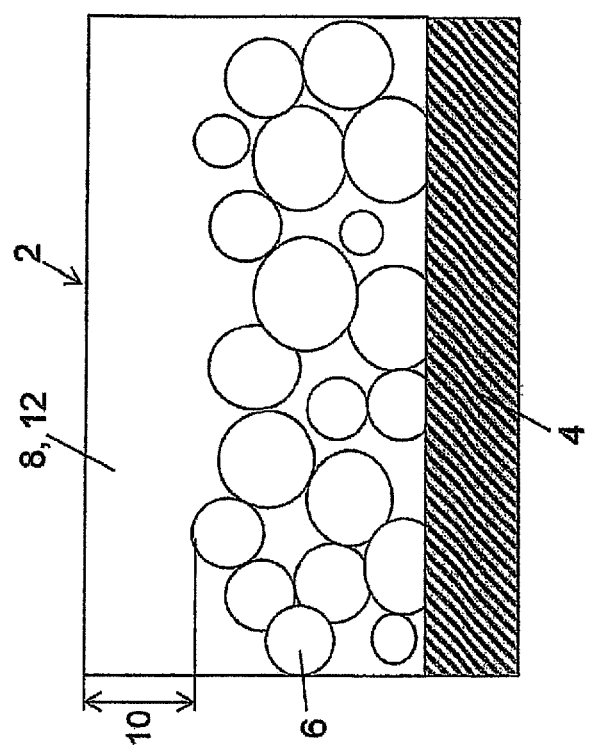
FIG. 1 shows a schematic sectional view of a metal-plastic plain-bearing composite material according to the invention.
Figure 3:
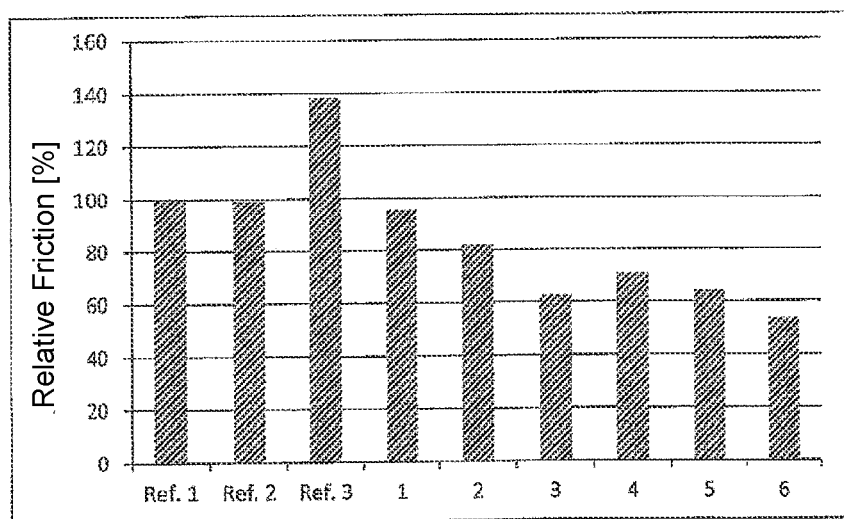

FIG. 3 shows measurement results for the coefficient of friction of comparison materials and the material according to the invention; and FIG. 1 shows a sectional view according to the invention of a plain-bearing composite material, generally designated by reference number 2. This comprises a metal support layer 4, preferably and typically made of steel. A porous carrier layer 6 in the form of sintered-on bronze particles of an exemplary composition Cu90Sn10 is sintered onto said layer in the shown case which is depicted by way of example and by preference. A sliding material 8 of a matrix-forming PTFE polymer base is applied in this three-dimensional porous carrier layer 6 in such a way that the sliding material 8 forms a protrusion 10 over the particles of the carrier layer 6 lying on top. The sliding material 8 thus forms a sliding layer 12 facing the sliding partner. According to the invention, the sliding material comprises 1 to 15 vol % barium sulfate, 5 to 20 vol % aramid, 1 to 10 vol % polyimide, 1 to 15 vol % fluorothermoplastic, the rest being formed by the PTFE polymer base. The fillers improve the tribological properties. In addition to barium sulfate, which is conducive to strength and is preferably present in fine particles, the polyimide or polyimides and the at least one aramid serve to improve the wear resistance of the material. The at least one fluorothermoplastic interacts with the PTFE and modifies the PTFE so that the fillers are better integrated.

It would also be conceivable that the sliding material 8 is not anchored in a separately applied carrier layer 6, but in a microstructured surface of the metal support layer 4 or is glued to the metal support layer 4 by means of an adhesive bonding layer.

Bushings to be tested of the structure according to FIG. 1 were produced from a plain-bearing composite material, i.e. brought to a cylindrical bushing shape with a butt joint in a bending rolling process. The sliding layer has the configuration mentioned in the table below. The tribological properties were tested using the test parameters that follow. The plain bearings were tested in a grease-lubricated barrel with a reversing rotational movement at an average speed of 0.03 m/s. The plain bearing rotates around an opposing rotor. The force is applied by a spring preloading and the plain bearing is pressed onto the counter body.

Test Parameters:

| | |
|---|---|
| Movement type | rotation, reversing, ±360° |
| $F_N$ | 1500N |
| v | 0.03 m/s |
| Lubrication | grease, saponified with lithium |
| Shaft Material | sintered metal |
| Shaft roughness, Rz | 2.5 μm |

The composition of the sliding material is shown in the table below. The figures are in vol % in relation to the sliding material.

| Example | PTFE | ZnS | C-fibers | aramid | BaSO4 | CaF2 | Fe2O3 | polyimide | PFA |
|---|---|---|---|---|---|---|---|---|---|
| Ref. 1 | 75 | 25 | | | | | | | |
| Ref. 2 | 75 | 17 | 3 | | | | | | 5 |
| Ref. 3 | 75 | | 3 (fibers) | | | 20 | 2 | | |
| 1 | 80 | | | 10 | 10 | | | | |
| 2 | 80 | | | 10 | | | | 10 | |
| 3 | 80 | | | | 10 | | | 10 | |
| 4 | 80 | | | 7 | 7 | | | 6 | |
| 5 | 80 | | | 10 | 5 | | | 5 | |
| 6 | 75 | | | 10 | 5 | | | 5 | 5 |

Reference 1 was used as a comparison sample. References 1, 2 and 3 are sliding materials of the applicant, which are known as prior art. Examples 1 to 5 do not correspond to the invention, comparative examples according to the invention, one or more of the fillers provided according to the invention not being provided here. Example 6 is an example according to the invention. The fillers were used in accordance with the following specification regarding particle sizes:

| Component | | Particle size | | Density [g/cm3] |
|---|---|---|---|---|
| | | Diameter, D50 [μm] | Measurement method | |
| aramid | poly-paraphenylene terephthalamide | 55 | ISO 13320 Static Laser Scattered Light Analysis (SLS) | 1.44 |
| barium sulfate | | 0.7 | DIN 66111 Particle Size Analysis via Sedimentation | 4.4 |
| polyimide | | 7 | ISO 13320 | 1.38 |
| FEP | copolymer of hexafluoro-propylene and tetrafluoro-ethylene | 36 | ISO 13320 | 2.16 |

Figure 2:
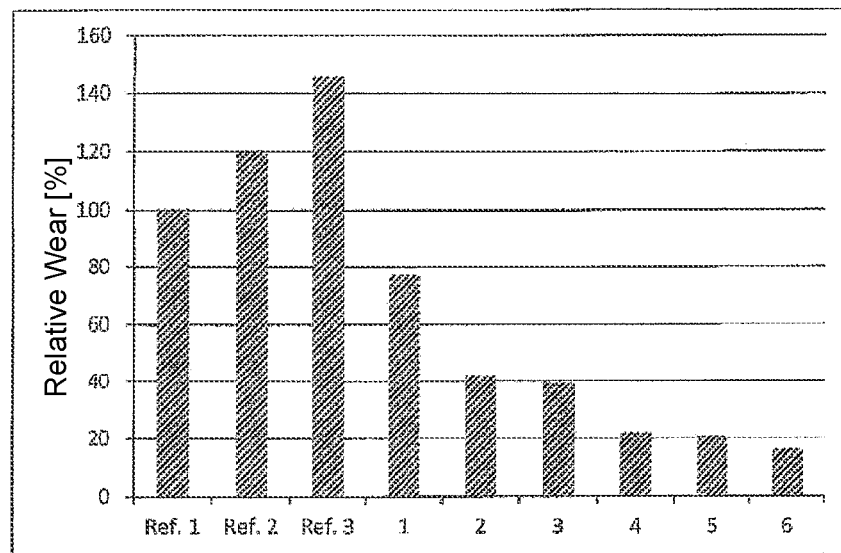
FIG. 2 shows measurement results for the wear resistance of comparison materials and the material according to the invention.

FIG. 2 shows the relative wear in relation to reference 1. It can be seen that reference 1 is 100%, with reference 2 still performing about 20% worse. Reference 3, which contains aramid fibers, shows even worse wear values. The wear then improves in Examples 1 to 6 and reaches its lowest and, therefore, best value in the example according to the invention (Example 6).

FIG. 3 shows the relative coefficient of friction, also based on 100% in reference 1. It can also be seen here that the relative coefficient of friction is the lowest for example 6 according to the invention, and the best sliding properties are thus achieved.

The invention claimed is:

1. A metal-plastic plain-bearing composite material (2), comprising a metal support layer (4), and a sliding layer (12) of a sliding material (8) of a matrix-forming polytetrafluoroethylene polymer base having discrete particles of fillers interspersed therethrough that improve the tribological properties, said sliding layer being in sliding contact with a sliding partner, wherein
the discrete particles of fillers comprise:
1-10 vol % barium sulfate,
10-15 vol % aramid,
1-8 vol % polyimide, and
1-8 vol % fluorothermoplastic, excluding polytetrafluoroethylene.

2. The metal-plastic plain-bearing composite material of claim 1, wherein the sliding material fillers comprise:
3-7% vol % barium sulfate,
10-13% vol % aramid,
3-8% vol % polyimide and
3-7 vol % fluorothermoplastic, excluding polytetrafluoroethylene PTFE.

3. The metal-plastic plain-bearing composite material of claim 1, wherein the aramid and/or the polyimide filler(s) is in powder form and/or in fibrous form.

4. The metal-plastic plain-bearing composite material of claim 1, wherein the ratio of the parts by volume of the fillers, barium sulfate to fluorothermoplastic, excluding polytetrafluoroethylene, is 3:1 to 1:3.

5. The metal-plastic plain-bearing composite of claim 1, wherein the fillers are substantially spherical filler particles and have a D50 value for barium sulfate of 0.2 mm to 1.4 μm, for aramid of 30 mm to 90 μm, for polyimide of 1 mm to 20 μm, and for fluorothermoplastic, excluding polytetrafluoroethylene, of 20 mm to 80 μm.

6. The metal-plastic plain-bearing composite material of claim 1, wherein the maximum particle size for aramid Dmax is <200 μm.

7. The metal-plastic plain-bearing composite material of claim 1, wherein the sliding material is lead-free.

8. The metal-plastic plain-bearing composite material of claim 1, wherein the sliding material (8) is anchored in a porous carrier layer (6) formed on the metal support layer (4).

9. The metal-plastic plain-bearing composite material of claim 1, wherein the sliding material (8) is anchored to a microstructured surface of the metal support layer (4).

10. The metal-plastic plain-bearing composite material of claim 1, wherein the sliding material (8) is applied to the metal support layer (4) by an adhesive bonding layer.

11. The metal-plastic plain-bearing composite material of claim 8, wherein the layer thickness of the metal support layer (4) is 0.15-5 mm, the layer thickness of the porous carrier layer (6) is at least 0.05 mm, and at most 0.6 mm, and protrusion (10) of the sliding material (8) over the porous carrier layer (6) is at least 10 μm, and at most 600 μm.

12. A plain bearing element comprising the metal-plastic plain-bearing composite material (2) of claim 1.

13. The plain bearing element of claim 12, wherein the plain bearing element is selected from the group consisting a sliding strip, a sliding shoe, a sliding pad, a sliding bearing shell, a slide bearing bush, and a collared bearing bush.

14. The metal-plastic plain-bearing composite material of claim 1, wherein the sliding material filler particles exclude zinc sulfide.

15. A metal-plastic plain-bearing composite material (2), comprising a metal support layer (4), and a sliding layer (12) of a sliding material (8) of a matrix-forming polytetrafluoroethylene polymer base having discrete particles of fillers interspersed therethrough that improve the tribological properties, said sliding layer being in sliding contact with a sliding partner, wherein the discrete particles of fillers comprise:
1-10 vol % barium sulfate,
10-15 vol % aramid,
1-8 vol % polyimide, and
1-8 vol % fluorothermoplastic, excluding polytetrafluoroethylene, and the fluorothermoplastic is selected from the group consisting of fluorinated ethylene propylene, perfluoroalkoxy alkane, perfluoromethylalkoxy, and combinations thereof.

16. The metal-plastic plain-bearing composite material of claim 1, wherein the ratio of the parts by volume of the fillers, aramid to polyimide, is 15:1 to 2:1.

17. The metal-plastic plain-bearing composite material of claim 16, wherein the ratio of the parts by volume of the fillers, aramid to polyimide, is 10:1 to 3:1.

18. The metal-plastic plain-bearing composite material of claim 15, wherein the fluorothermoplastic is perfluoroalkoxy alkane.

19. A method for producing a sliding material for a metal-plastic plain-bearing composite material comprising adding fillers that improve the tribological properties to a polytetrafluoroethylene polymer base of the sliding material, wherein the fillers are spherical filler particles and have the following proportions and particle sizes:
1-10 vol & barium sulfate,
10-15 vol % aramid,
1-8 vol % polyimide, and
1-8 vol % fluorothermoplastic excluding polytetrafluoroethylene,
and
a D50 value for
barium sulfate of 0.2 mm to 1.4 μm,
aramid of 30 mm to 90 μm,
polyimide of 1 mm to 20 μm and
fluorothermoplastic of 20 mm to 80 μm.

20. The method of claim 19, wherein the aramid filler is a powder having a maximum particle diameter Dmax<200 μm.

* * * * *